United States Patent [19]

Jackowski et al.

[11] Patent Number: 4,561,094
[45] Date of Patent: Dec. 24, 1985

[54] INTERFACE CHECKING APPARATUS

[75] Inventors: Stefan P. Jackowski, Endicott; James T. Moyer, Endwell, both of N.Y.

[73] Assignee: International Business Machines Corporation, Armonk, N.Y.

[21] Appl. No.: 508,772

[22] Filed: Jun. 29, 1983

[51] Int. Cl.⁴ ............................................. G06F 11/00
[52] U.S. Cl. .......................................... 371/24; 371/71
[58] Field of Search ....................... 371/22, 24, 49, 25, 371/37, 71; 324/73 R

[56] References Cited

U.S. PATENT DOCUMENTS

| | | | |
|---|---|---|---|
| 3,492,641 | 1/1970 | Harmon | 371/37 |
| 3,500,318 | 3/1970 | Arlen | 371/22 |
| 4,003,020 | 1/1977 | Clarke | 371/37 |
| 4,257,031 | 3/1981 | Kirner et al. | 371/24 X |
| 4,298,982 | 11/1981 | Auerbach | 371/24 X |

OTHER PUBLICATIONS

Checking Single Bit Changes, H. Baeumer, D. Bazlen, K. J. Getzlaff, J. Hajdu & S. Richter, Technical Disclosure Bulletin, vol. 21, No. 11, Apr. 1979, p. 4572.

Primary Examiner—Charles E. Atkinson
Attorney, Agent, or Firm—John H. Bouchard

[57] ABSTRACT

Interface lines interconnect a first circuit to a second circuit. When an abnormal circuit condition affects the interface lines, such as an open circuit or a short circuit condition, the operation of the first and second circuit is detrimentally affected. This invention determines the existence of abnormal circuit conditions in one or more lines of a group of interface lines without using redundant duplex lines. The interface lines are subdivided into a first group, which are used when the apparatus of the present invention is being used to locate abnormal circuit conditions, and a second group, which are not used when the apparatus of the present invention is being used to locate abnormal circuit conditions. Each line of the first group is connected, at its input side, to a corresponding input terminal of a first exclusive-or gate and, at its output side, to a corresponding input terminal of a second exclusive-or gate. The first and second exclusive-or gates are input to a matching circuit, an output signal from the matching circuit indicating the existence of an abnormal circuit condition in the first group of lines. One line of the first group is connected to an input side of the second group. The output side of the second group is connected to an additional input terminal of the second exclusive-or gate. An output signal from the matching circuit indicates the existence of an abnormal circuit condition in at least one line of either one or both of the first and second group of lines.

3 Claims, 1 Drawing Figure

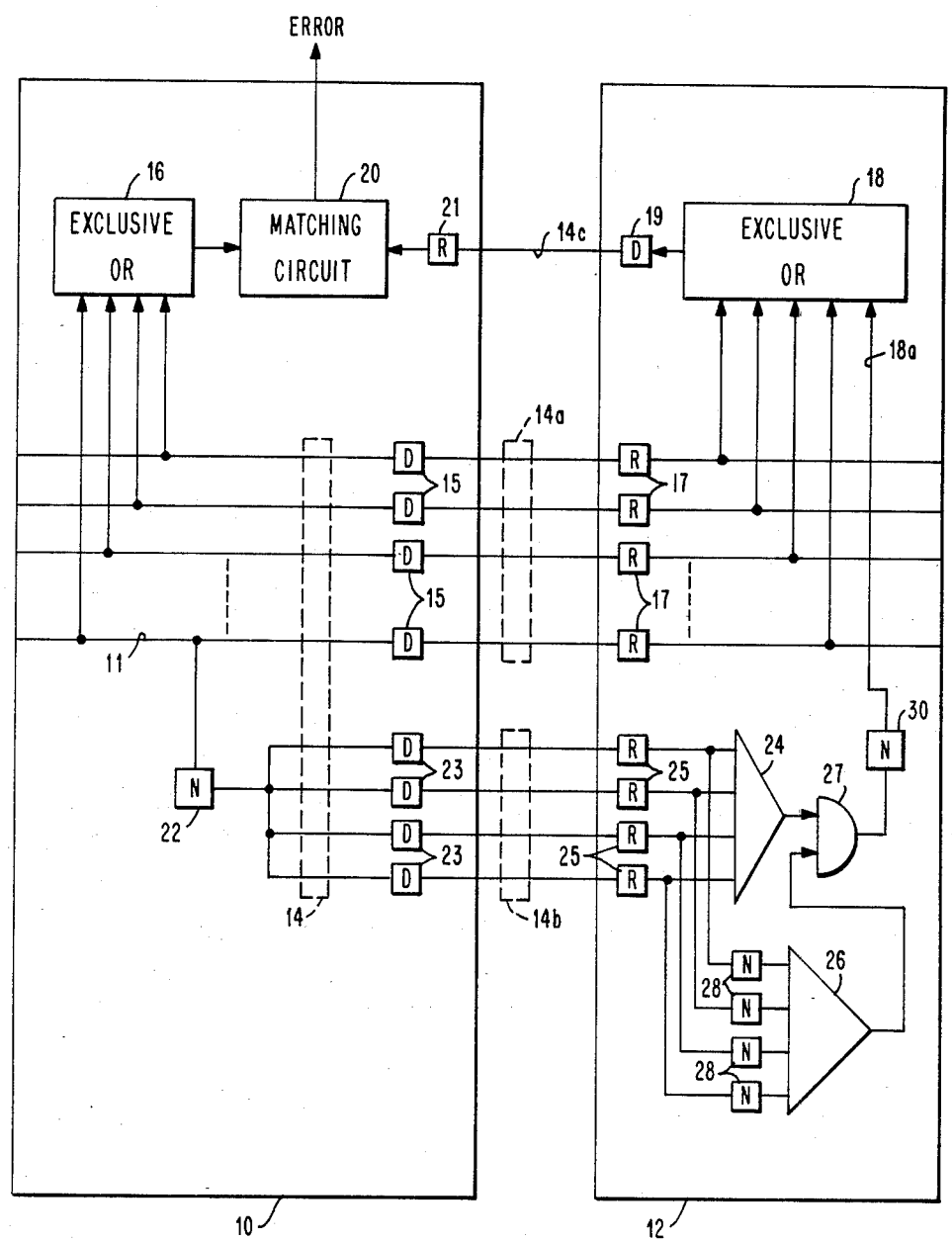

INTERFACE CHECKING APPARATUS

BACKGROUND OF THE INVENTION

1. Field of the Invention

The subject matter of the present invention pertains to a computer system, and more particularly, to an error detection mechanism in said computer system for detecting the existence of abnormal circuit conditions in a multitude of interface lines extending between circuit modules.

2. Description of the Prior Art

Circuit modules are connected together by a multitude of interface lines. Some of these lines are used as control lines for controlling the transfer of data from on module to another. Some of the control lines may be used during a data mode and a non-data mode whereas others of these control lines may be used only in the data mode. If an abnormal circuit condition occurred within one or more of these control lines, the one or more of these control lines would no longer perform their intended function.

An abnormal circuit condition is defined to be a failure of a receiver to sense the existence of an intended transmitted signal, and may be caused by an open-circuit or short circuit condition existing in one or more of the interface lines.

In order to detect the existence of abnormal circuit conditions within these control lines, redundant, duplex lines, corresponding to each of the control lines, were often utilized. For example, if a duplex line was associated with a control line, a signal transmitted from one module to another via said control line would also be transmitted via said duplex line. The control line and the duplex line were each attached to an input terminal of an exclusive OR gate. The presence of said signal at each input terminal of the exclusive OR gate would cause the generation of a zero output signal therefrom. Thus, the control line and the duplex line were each operational. However, if an abnormal circuit condition affected the operation of the control line, a signal would not be present at the input terminal of the exclusive OR gate corresponding to the control line. The exclusive OR gate would generate a high (binary one) output signal. The presence of a high output signal generated from the exclusive OR gate would indicate that an abnormal circuit condition affected either the control line or the duplex line. However, it is not cost effective nor is it necessarily feasible from an engineering standpoint to provide a redundant duplex line for each interface line extending from one circuit module to another circuit module.

The prior art, such as IBM Technical Disclosure Bulletin Vol. 12, No. 4, Sept. 1969, page 615, discloses one method of detecting the existence of an abnormal condition in a circuit. A signal is introduced as an input signal to the circuit and an output signal is developed. A compare circuit, such as an AND gate, compares the input signal with the output signal. An error signal is developed from the compare circuit if a correct output signal is not received by the compare cicuit corresponding to the input signal. However, this prior art fails to recognize the problems encountered when two or more circuit modules are connected together by a multitude of interface lines, namely, the possibility of the existence of abnormal circuit conditions in the multitude of interface lines and the impossibility of providing a redundant, duplex line for each interface line to detect the existence of an abnormal circuit condition in said interface line. The prior art also includes the following additional publications, each of which similarly fail to recognize said problems: IBM Technical Disclosure Bulletins, (1) Vol. 18, No. 3, Aug. 1975; page 928; (2) Vol. 11, No. 2, July 1968, page 197; (3) Vol. 24, No. 1 A, June 1981, page 24; (4) Vol. 21, No. 11, April 1979, page 4572; and (5) Vol. 7, No. 10, Mar. 1965, page 905.

SUMMARY OF THE INVENTION

It is a primary object of the present invention to provide an apparatus for determining the existence of an abnormal circuit condition within one or more interface lines which interconnect circuit modules without utilizing redundant duplex lines associated with said interface lines to detect the existence of said abnormal circuit condition.

It is another object of the present invention to provide said apparatus for determining the existence of an abnormal circuit condition within one or more interface lines which interconnect circuit modules wherein said interface lines are used as control lines.

It is another object of the present invention to provide said apparatus for determining the existence of an abnormal circuit condition within one or more interface lines which interconnect circuit modules wherein said control lines are used in a non-data mode and a data mode.

It is another object of the present invention to provide said apparatus for determining the existence of an abnormal circuit condition within one or more interface lines which interconnect circuit modules wherein said control lines are used only in a data mode.

In order to accomplish these and other objects of the present invention, each line of a group of interface lines is a control line and is used when operating in a non-data mode and a data mode. The apparatus of the present invention is utilized only when operating in the non-data mode. An input to a group of interface lines is connected to a corresponding input of a first exclusive OR gate. An output from the group of lines is also connected to an input of a second exclusive OR gate. The outputs from the two exclusive OR gates are connected to a matching circuit, which may be another exclusive OR gate. An output signal generated from the matching circuit, which may be another exclusive OR gate. An output signal generated from the matching circuit indicates that an abnormal circuit condition (e.g.—an open circuit condition) exists on one or more of the group of lines. The output signal from the matching circuit represents one return line for the entire group of lines. Since the one return line is utilized for the entire group of lines, if an output signal is generated from the matching circuit, an abnormal circuit condition exists within one or more lines of the group of interface lines.

A further group of lines are connected to one line of the group of interface lines via an inverter. An output from the further group of lines is connected to an input of the second inclusive OR gate via another inverter and a pair of AND gates. Each line of this further group of lines is used only in a data mode. As a result, since the further group of lines are not utilized in the non-data mode, each of the lines of this further group are connected to one line of the former group of interface lines and are assembled together for the purpose of detecting the existence of an abnormal circuit condition within this further group. If the circuit condition of one or more lines of the further group of lines is not abnormal, that is, if one or more of these lines is not open circuited, binary 0s or binary 1s will appear on each line of said further group of lines. As a result, all of the lines of the further group of lines are tested, collectively, as a group, without the need for additional redundant duplex lines, for each of the lines, to assist in performing the test.

Therefore, in accordance with the present invention, the failure of a single receiver to sense the existence of a signal transmitted by a transmitter will be detected, and an error signal will be generated representative of this failure.

Further scope of applicability of the present invention will become apparent from the detailed description given hereinafter. However, it should be understood that the detailed description and the specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWING

A full understanding of the present invention will be obtained from a reading of the detailed description given hereinbelow and the accompanying drawing, which are given by way of illustration only, and thus are not limitative of the present invention, and wherein:

The drawing figure illustrates a schematic of a plurality of interface lines interconnecting circuit modules and connected to the apparatus of the present invention for determining the existence of abnormal circuit conditions within a multitude of interface lines connecting circuit modules.

DESCRIPTION OF THE PREFERRED EMBODIMENT

Abnormal circuit conditions, such as a short circuit or an open circuit, associated with one or more interface lines interconnecting circuit modules, will detrimentally affect the functional operation of the circuit modules. Therefore, the existence of the abnormal circuit conditions must be determined. However, a major objective in the design and development of a system for performing this determination must be the utilization of the existing interface lines which interconnect the circuit modules without utilizing redundant duplex lines to assist in performing the determination.

Referring to the drawing figure, a plurality of interface lines are illustrated interconnecting circuit modules, the interface lines being connected to the apparatus of the present invention for determining the existence of abnormal circuit conditions within one or more lines of the plurality of interface lines. The apparatus of FIG. 1 accomplishes the major objective of determining the existence of abnormal circuit conditions within a plurality of interface lines, without utilizing redundant duplex lines to assist in performing the determination.

In the drawing figure, a first circuit module 10 is connected to a second circuit module 12 via a plurality of interface lines 14. The plurality of interface lines 14 are subdivided into a first group of interface lines 14a and a second group of interface lines 14b. The first group of interface lines 14a include an input side, within the first circuit module 10, and an output side, within the second circuit module 12. A plurality of driver circuits 15 are associated, respectively, with the first group of interface lines 14a on the input side, and a plurality of receiving circuits 17 are associated, respectively, the first group of interfaced lines 14a on the output side. The input side of each of the first group of lines 14a is connected, respectively, to the input terminals of a first exclusive OR gate 16. The output side of each of the first group of lines 14a is connected, respectively, to the input terminals of a second exclusive OR gate 18. A matching circuit 20 receives output signals from the first exclusive OR gates 16 and from the second exclusive OR gate 18 via a driver circuit 19, line 14c, and a receiver circuit 21, and may generate an error signal depending upon the output signals from the first and second exclusive OR gates.

The input side of one of the first group of lines 14a is connected to the input side of each of the second group of lines 14b via an inverter 22. A plurality of driver circuits 23, associated with each of the second group of lines 14b on the input side, are connected to the inverter 22. A plurality of receiver circuits 25, associated with each of the second group of lines 14b on the output side, are connected to the plurality of driver circuits 23. The plurality of receiver circuits 25 are connected to corresponding input terminals of a first AND gate 24. The plurality of receiver circuits 25 are also connected to corresponding input terminals of a second AND gate 26 via a plurality of inverters 28. The output terminals of the first and second AND gates 24 and 26 are connected to input terminals of an OR gate 27. The output terminal of the OR gate 27 is connected to the second exclusive OR gate 18 via a second inverter 30.

The first and second group of lines 14a and 14b are control lines, that is, they are used by the first circuit module 10 to control the operation of the second circuit module 12. The first group of lines 14a are used when operating in a non-data mode and a data mode. However, the second group of lines 14b are used only when operating in a data mode. Since the first and second group of lines 14a and 14b are control lines, the apparatus of the present invention, for determining the existence of abnormal circuit conditions in a multitude of interface lines extending between circuit modules, is used only when operating in a non-data mode. Since the second group of lines 14b are not used when operating in non-data mode, they may be lumped together, as shown in the drawing, and connected to one line of the first group 14a, for the purpose of determining the existence of abnormal circuit conditions existing within the second group of lines 14b. However, since the lines of the first group 14a are used when operating in a non-data mode, each of said lines must remain individually operative in order to determine the existence of abnormal circuit conditions in one or more lines of said first group 14a.

The functional operation of the interface checking apparatus of the present invention will be described in the paragraphs below with reference to the drawing figure.

As previously mentioned, the first and second group of lines 14a and 14b are control lines, however, the first group 14a is used in a non-data mode and a data mode whereas the second group 4b is used only in data mode. Therefore, control signals are transmitted from the first circuit module 10 to the second circuit module 12 via the first group of lines 14a when operating in a non-data mode; however, signals are not transmitted via the second group of lines 14b when operating in a non-data mode.

For this particular embodiment, the first and second exclusive OR gates 16 and 18 (and the matching circuit 20, since the matching circuit may also be an exclusive OR gate) develop output signals when an odd number of their respective input terminals are energized by a signal. Similarly, the first and second exclusive OR gates 16 and 18 (and perhaps the matching circuit) do not develop output signals when an even number of their respective input terminals are energized by a signal.

If an even number of the first group of lines 14a are energized by control signals during the non-data mode, and if an abnormal circuit condition (such as a short circuit or an open circuit) does not exist in any of the lines 14a, a corresponding even number of the input terminals of the first and second exclusive OR gates will be energized by a control signal. Therefore, an output signal will not be generated by the first and second exclusive OR gates 16 and 18. Since both input terminals of the matching circuit 20 will not be energized by a signal, an output signal will not be generated therefrom. An output signal from the matching circuit 20 would have indicated that an abnormal circuit condition exists in one or more lines of the first and/or second group of lines 14a and 14nb, respectively.

However, if an abnormal circuit condition does exist in one or more of the first group of lines 14a, and if an even number of control signals are generated at the input side of the first group of lines 14a for propagation along a corresponding even number of said first group of lines, an odd number of control signals may appear at the output side of the first group of lines 14a. As a result, the even number of control signals at the input side of said first group of lines will energize a corresponding even number of input terminals of the first exclusive OR gate 16. The odd number of control signals at the output side of said first group of lines will energize a corresponding odd number of input terminals of the second exclusive OR gate 18. An output signal will not be generated from the first exclusive OR gate 16; however, an output signal will be generated from the second exclusive OR gate 18. The matching circuit 20 will receive an input signal at one input terminal, but will not receive an input signal at the other input terminal. As a result, an error signal will be generated therefrom indicative of an abnormal circuit condition existing in one or more of the first or second group of lines 14a, 14b, respectively, or in line 14c. Although the actual line or lines undergoing the abnormal condition is not identified, the abnormal condition is localized to one or more lines of the first and second group. Furthermore, the general locality of the abnormal condition has been identified utilizing the existing interface lines interconnecting the circuit modules 10 and 12, and without the need for additional redundant duplex lines to perform the identification.

If an abnormal circuit condition occurs within line 14c, which interconnects driver circuit 19 to receiver circuit 21, and if an abnormal circuit condition does not exist within the first group of lines 14a or the second group of lines 14b, the matching circuit 20 will generate an error signal indicative of the abnormal circuit condition in line 14c.

The previous description of the functional operation of the present invention centered around the identification of an abnormal condition in one or more lines of the first group of lines 14a and in line 14c. The following discussion will involve the identification of an abnormal condition in one or more lines of the second group of lines 14b.

If a control signal is transmitted from the first circuit module 10 to the second circuit module 12 via line 11 during the non-data mode, the control signal is inverted by inverter 22. If an abnormal circuit condition does not exist in any of the second group of lines 14b, the inverted control signal will appear at the output side and at the input side of each of the second group of lines 14b. Assuming that the inverted control signal is a binary "0", a binary "0" will appear on each of the second group of lines 14b. The first AND gate 24 will receive binary 0s at each of its input terminals. However, the second AND gate 26 will receive binary 1s at each of its input terminals, the binary 0s being inverted via inverters 28 to the binary 1s. A binary 0 signal will appear at the output terminal of AND gate 124, however, a binary 1 signal will appear at the output terminal of AND gate 26. As a result of the operation performed by OR gate 27, a binary 1 signal will appear at the output terminal of the OR gate 27. The binary 1 is changed to a binary 0 via inverter 30.

The output terminal of the inverter 30 is connected to a fifth input terminal 18a of the second exclusive OR gate 18. Note that there are four input terminals associated with the first exclusive OR gate 16. Therefore, the presence of a binary 1 or 0 at the fifth input terminal of the second exclusive OR gate 18 determines whether an error signal is generated from the matching circuit 20. If a binary 1 energizes the fifth input terminal, an error signal is generated from the matching circuit 20. If a binary 0 energizes the fifth input terminal, an error signal will be generated only if an abnormal condition exists in one or more of the first group of lines 14a. In the above example, a binary 0 energizes the fifth input terminal. Assuming that there are no abnormal circuit conditions associated with the first group of lines 14a, no error signal is generated from the matching circuit 20 in response to the presence of a binary 0 at the fifth input terminal.

Assume that an abnormal circuit condition (e.g.—an open circuit) exists in one or more of the second group of lines 14b. The inverted control signal, appearing at the output of the inverter 22, will appear on each of the second group of lines 14b at the input side, within circuit module 10. However, the inverted control signal will not appear on each of the second group of lines 14b at the output side, within circuit module 12. Therefore, a binary 0 appears at the output terminal of OR gate 26, A binary 1 therefore appears at the output terminal of inverter 30. Since this output energizes the fifth input terminal 18a of the second exclusive OR gate 18, the output signal from the second exclusive OR gate 18 will be different than the output signal from the first exclusive OR gate 16. As a result, an error signal is generated at the output terminal of the matching circuit 20 indicative of the presence of an abnormal circuit condition in one or more of the first and/or second group of lines 14a, 14b respectively, or in line 14c.

With the continual miniaturization of integrated circuits, the availability of input/output (I/O) pins associated with said circuits has decreased. However, the need to test for the existence of abnormal circuit conditions within the interface lines connected to said I/O pins has increased as a result of said miniaturization. The present invention satisfies this need without requiring additional I/O pins or additional corresponding redundant duplex lines to perform the testing.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. An apparatus for locating an abnormal circuit condition in a group of interface lines interconnecting a first circuit module to a second circuit module, said group of interface lines being connected to a first group of lines disposed within said first circuit module and to a second group of lines disposed within said second circuit module, comprising:

first gate means disposed within said first circuit module and connected to said first group of lines for generating an output signal when a signal exists on a predetermined number of said first group of lines prior to transmission across said group of interface lines;

second gate means disposed within said second circuit module and connected to said second group of lines for generating an output signal when a signal exists on said predetermined number of said second group of lines subsequent to transmission across said group of interface lines; and circuit means connected to the first and second gate means for comparing the output signal from said first gate means, representative of the signal existing on said first group of lines prior to transmission across said group of interface lines, and the output signal from said second gate means, representative of the signal existing on said second group of lines subsequent to transmission across said group of interface lines, and for generating an error signal indicative of the existence of said abnormal circuit condition in at least one line of said group of interface lines when similar output signals are not received from said first and second gate means.

2. An apparatus for locating an abnormal circuit condition in a first group of interface lines and second group of interface lines interconnecting a first circuit module to a second circuit module, the first group of interface lines being used when said apparatus is locating said abnormal circuit condition, the second group of interface lines not being used when said apparatus is locating said abnormal circuit condition, comprising:

first gate means connected to an input of said first group of inerface lines, said first gate means generating an output signal when a signal exists on a predetermined number of said interface lines at the input of said first group of interface lines;

second gate means connected to an output of said first group of interface lines, the second gate means generating an output signal when a signal exists on said predetermined number of said interface lines at the output of said first group of interface lines;

matching circuit means connected to the first and second gate means for determining if a matched condition exists at the output of the first and second gate means and for generating an output signal when said matched condition does not exist, the presence of said output signal from said matching circuit means indicating that an abnormal circuit condition exists in at least one line of said first group of interface lines;

means for connecting one of said first group of lines to an input of each of said second group of lines; and means for connecting an output of said second group of lines to an additional input of said second gate means, an output signal from said matching circuit means indicating that an abnormal circuit condition exists in at least one line of the second group of lines.

3. The apparatus of claim 2, wherein said means for connecting an output of said second group of lines to an additional input of said second gate means comprises:

first means connected to an output of each line of said second group of interface lines for developing an output signal when a signal exists on each line of said second group of interface lines;

second means connected to an output of each line of said second group of interface lines for inverting the signals appearing on each line of the second group of interface lines and for generating an output signal when an inverted signal appears on each line corresponding to each line of said second group of interface lines;

third means connected to the output of said first means and said second means for developing an output signal if either one or both of the output signals from said first means and said second means is developed; and inverting means connected to an output of said third means for inverting the output signal received from said third means.

* * * * *